Dec. 25, 1951     P. H. EGOLF, SR     2,579,807
DISPLAY APPARATUS
Filed April 11, 1946     3 Sheets-Sheet 1
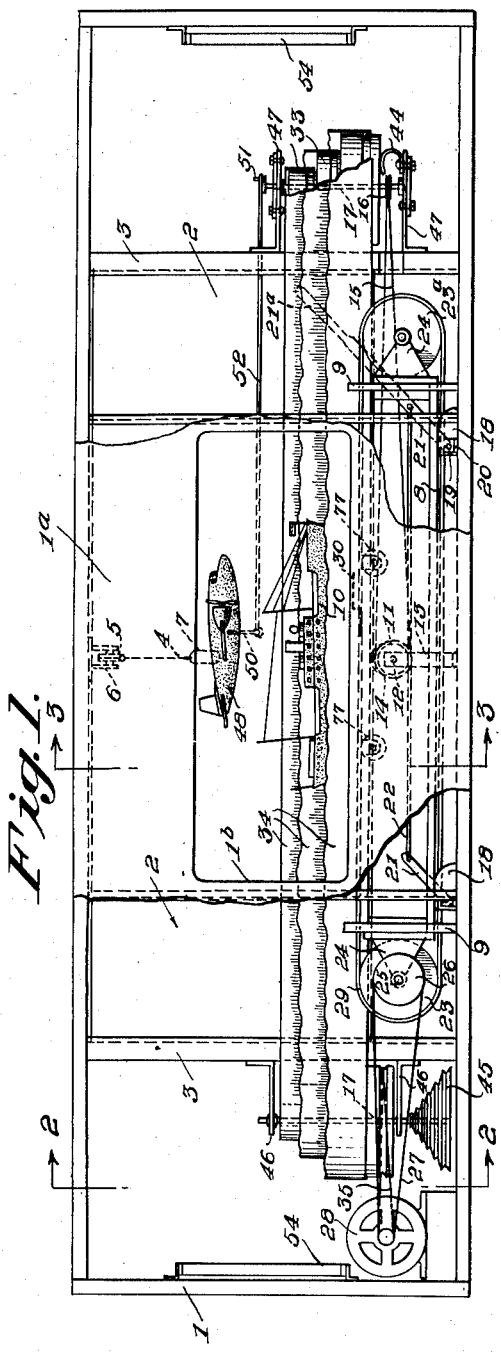
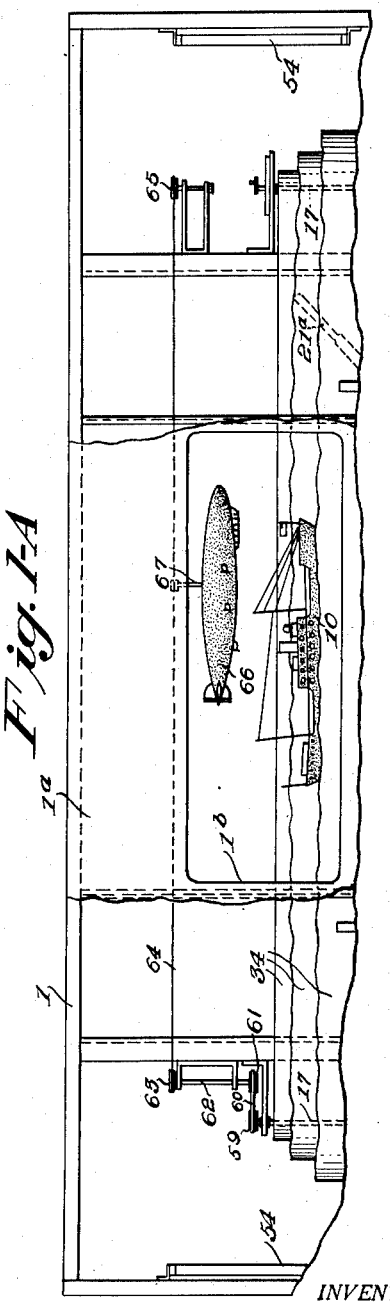
INVENTOR.
Paul Hewlett Egolf, Sr.
BY
ATTORNEY Dec. 25, 1951 P. H. EGOLF, SR 2,579,807
DISPLAY APPARATUS
Filed April 11, 1946 3 Sheets-Sheet 2
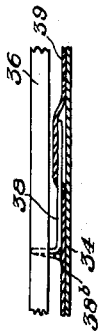
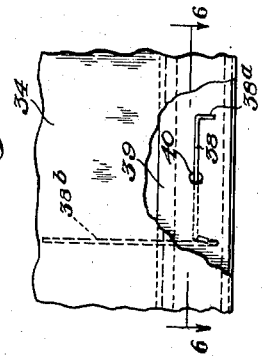
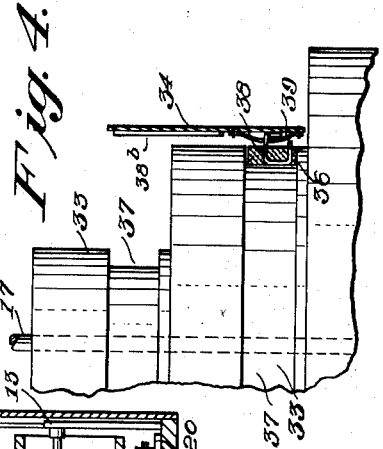
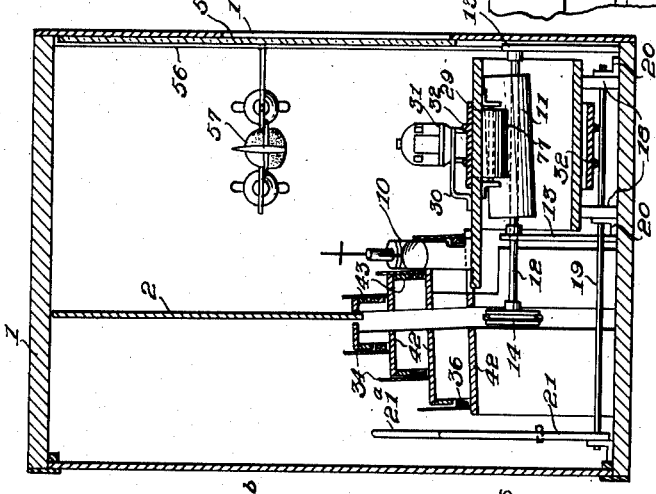
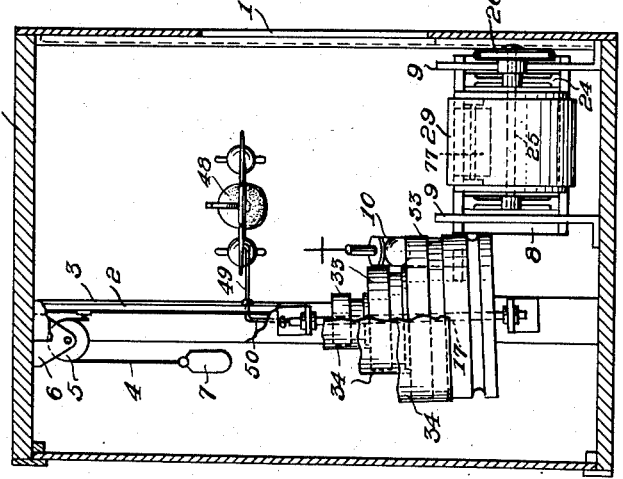
Inventor
Paul Hewlett Egolf, Sr.
by James Askins
Attorney Dec. 25, 1951 P. H. EGOLF, SR 2,579,807
DISPLAY APPARATUS
Filed April 11, 1946 3 Sheets-Sheet 3
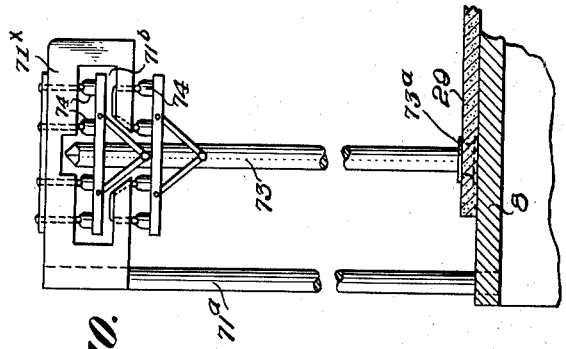
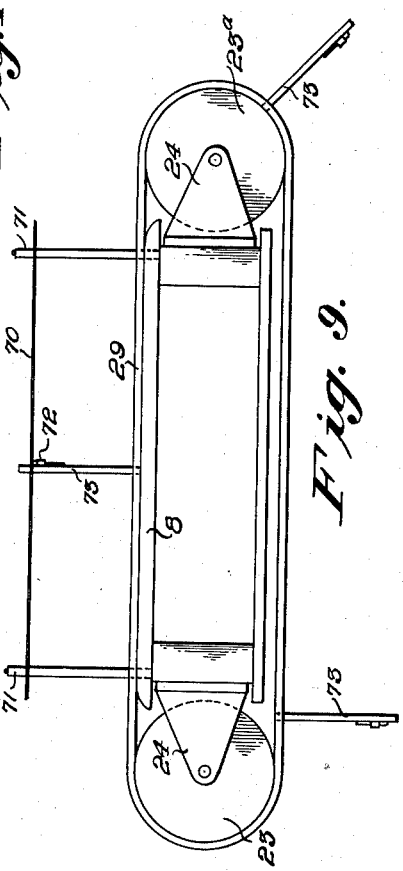
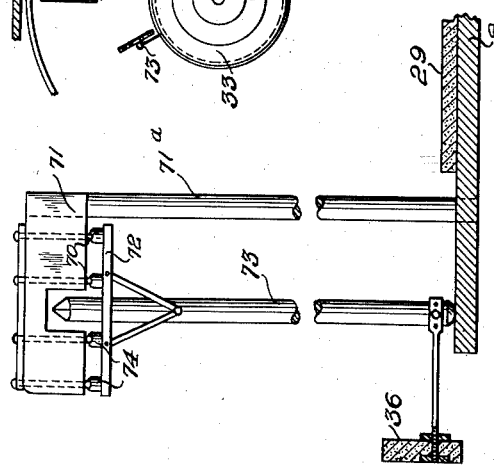
Inventor
Paul Hewlett Egolf, Sr.
By
Attorney Patented Dec. 25, 1951

2,579,807

UNITED STATES PATENT OFFICE 2,579,807

DISPLAY APPARATUS

Paul Hewlett Egolf, Sr., Chevy Chase, Md.

Application April 11, 1946, Serial No. 661,257

15 Claims. (Cl. 40—32)

This invention relates to motion displays for creating the illusion of viewing traveling land, water, and/or air vehicles, either separately as to subject and environment, or in various combinations.

From time to time many efforts have been made to provide devices for conveying the sensation of travel, but to my knowledge the prior art does not reveal any apparatus suitable or satisfactory for the purposes of the present invention.

The difficulties arise from a number of factors, but primarily from the fact that all such apparatus, with one exception with which I am familiar, have been intended to convey the sensation of travelling upon or in a land or water vehicle, rather than viewing such a vehicle or vehicles travelling at constant speed from a short distance away, as in the present invention. In some devices a view of moving animals or humans has been contemplated, but these have inherent defects in the light of the vehicular application of the present invention.

Moreover, so far as I know, the prior art does not disclose any attempt to convey a view of an aircraft continuously in flight, or landing, or taking off, as embodied in the present invention.

In the apparatus disclosed in my Patent No. 1,545,133, many defects were found to be present, and the illusion fell short of being complete. These defects are remedied by my present invention, together with a broad expansion of the scope of my original conception.

One object, therefore, of the present invention is to provide not only for a perfection of the illusion of viewing travelling land vehicles, but also for continuously viewing water and air vehicles, within a specified space, which may be a cabinet, housing, or frame with suitable draperies, a display window or exhibition space with or without such a cabinet or housing, but with framing suitable for assembling the various units necessary to depict the desired transportation subject in continuous motion, save where it is desirable to depict it as stopping or starting at stations or the like, as with trains, or landing and taking off, as with aircraft.

Another object is to provide a cabinet, housing or frame wherein, by suitable disposition of parts, such land, water, or air vehicles may be viewed travelling either singly or in any combination.

A further object is to provide such a cabinet, housing, or frame for the viewing of such transportation subjects, racing each other, or overtaking and passing one another, while one or more remains before the spectator moving at continuous speed.

A still further object is to endow the travelling transportation subjects viewed with the characteristic motions of their prototypes, if desired, for instance, the swaying of a train, the yawing or rise-and-fall of an aircraft in flight, or the roll-and-pitch of a boat at sea, or in rough water, or in a storm.

Moreover, in the case of land vehicular subjects, or air-craft portrayed in flight over land, provision is made in the present invention for portraying and passing of roadside objects, such as telegraph poles, or high-tension towers, or the overhead supports of electrified railway conductors, together with the illusion that their associated wires are moving past the spectator along with such vertical objects. Also, means are provided for having stations, halts, docks, or airports come into view and having the transportation subject apparently slow down and stop at them, and then resume its journey if desired. Also by this means, with the use of a suitably timed curtain over the viewing aperture for the spectator, a point-to-point journey of a vehicle may be simulated by land, water, or air, or in combination if warranted.

With the foregoing and other objects in view which will appear as the description proceeds, the invention consists in the novel features hereinafter described in detail, illustrated in the accompanying drawings, and more particularly pointed out in the appended claims.

In the drawings, preferred embodiments of such apparatus built according to this invention are illustrated. In said drawings:

Figure 1 is a front elevation of one embodiment of the apparatus with its front wall broken away at either side of its central portion to show the main mechanical features.

Fig. 1-A is a fragmentary similar view depicting a modified arrangement, whereby an aircraft may be viewed while passing a water or land vehicle.

Fig. 2 is a vertical cross-section taken on the line 2—2 of Fig. 1, looking in the direction of the arrows and with the prime mover removed.

Fig. 3 is a similar view taken on the line 3—3 of Fig. 1, although not through any of the vehicular objects and with a miniature train added.

Fig. 4 is a fragmentary elevation in vertical section of the means for driving one of the vertical scenery strips through a compensating means from a belt of less height than the strip, to provide for the extra arc through which the strip passes (in contrast to the narrower belt) when passing around an end roller for the scenery.

Fig. 5 is a fragmentary side elevation, partly broken away, of one of the scenery strips and the means for connecting it to its driving belt.

Fig. 6 is a horizontal sectional view, taken on the line 6—6 of Fig. 5.

Fig. 7 is a fragmentary plan view partly in horizontal section of another modification of the apparatus depicting means for the passing of telegraph poles or similar wire-supporting elements, and apparently their wires, before the spectator when vehicles requiring such adjuncts to the illusion, are the subject of display.

Fig. 8 is a vertical sectional view on an enlarged scale of a portion of the structure shown in Fig. 7 and showing means for attaching the telegraph poles or the like to a scenery drive belt, and with means for supporting the wires while a cross-arm of the telegraph pole engages such wires.

Fig. 9 is an elevation of a detail of alternate means, in which the poles or vertical supports are attached to the horizontally moving surface or road belt instead of to one of the scenery belts.

Fig. 10 is a view similar to Fig. 8 showing means for imparting the illusion that the telegraph poles have multiple cross-arms which cooperate with upper and lower strands of wires.

In the embodiment of the invention illustrated in Figs. 1, 2 and 3, a cabinet or casing 1 is provided with a front wall 1a having a centrally disposed viewing aperture 1b. Within the casing a vertically disposed panel 2 is arranged parallel to the front wall thereof, and such panel may be decorated in any suitable way to represent the sky, preferably without clouds. If it is desired to show clouds, the panel may be of translucent material, upon which clouds may be projected from any suitable projecting apparatus, not shown.

The panel 2 is slidably arranged in vertical guides 3 so that it may be raised or lowered by any suitable means, such as a belt or cord 4 extending over a pulley 5 rotatably supported in a bracket 6 arranged at the top of the casing. One end of the cord may be connected to the panel and the other end provided with a counterweight 7.

Centrally disposed in the foreground of the casing behind the viewing aperture 1b is a vertically movable frame 8, retained by vertical guides 9 in which it has a comparatively loose fit. This is utilized in the display of water or land vehicles, such as the ship 10, which is mounted upon the top of the frame 8, as best shown in Fig. 3.

To depict this ship moving continuously in quiet water, the frame 8 remains at rest, but if it is desired to impart a roll-and-pitch motion to the ship, use is made of one or more eccentrics within and/or below the top of the frame 8, as exemplified by an off-center cylinder 11 fixed on a shaft 12, journalled in brackets 13. The shaft may be rotated by any suitable means, for example, by a belt 15 (Fig. 1) engaging a pulley 14 fixed to the shaft and driven by a pulley 16 secured to a vertical shaft, later referred to. It is obvious that if the belt 15 is disconnected from the pulleys, the shaft 12 will not be driven and the ship will remain level, otherwise it will roll and pitch in a realistic manner where it is desired to simulate its course through rough water, the sea, or a storm.

Cams 18 (Figs. 1 and 3) are arranged on the bottom of the casing below the frame 8 for raising and lowering the latter, and these cams are mounted on shafts 19 supported in brackets 20. In order that the cams may move in unison, the shafts to which they are affixed are provided with fixedly mounted levers 21 interconnected by a link 22. One of the levers is provided with a hand grip extension 21a, and if it is moved in a counterclockwise direction (Fig. 1) it will cause each cam to move through an arc of 90° so as to elevate the frame 8 to a position above and out of contact with the cylinder 11 so the frame will not be affected by movement of the cylinder. When the frame is in elevated position, it is utilized for the display of road vehicles.

If road vehicles form the subject of the display, either alone or in combination with marine and/or air vehicles, the ends of frame 8 are provided with rollers 23, 23a rotatably supported in brackets 24 fixed to the frame. The rollers are horizontally arranged and the roller 23 may be driven, while the roller 23a functions as an idler. Roller 23 may be driven by any suitable means, for example, its shaft 25 may be provided with a pulley 26 driven by a belt 27 from any suitable prime mover, such as an electric motor 28.

An endless belt 29 passes around the rollers 23 and 23a and has its maximum width in a horizontal plane. In the example illustrated in Fig. 1, the top bight of the belt travels from right to left or counterclockwise.

Fixed to the top of the frame, just behind the rear edge of the belt 29, is a bracket 30, of special form, and used to retain a miniature land vehicle, such as a train 31 positioned to be seen through the viewing aperture 1b.

From Figs. 1, 3 and 7 it may be seen that the bracket is of L shape in plan with its base fixed to the top of the frame 8. Its intermediate portion extends longitudinally of the frame and its free extremity extends transversely of the frame and is elevated above the frame.

If a land vehicle 31 be placed upon the upper bight of the belt 29 with the free end portion of the bracket inserted from the rear in a horizontal hole in such vehicle and there be a loose fit between the bracket and hole, with collars to restrict its lateral motion, it will be seen that when the belt 29 is operated, with the vehicle arranged longitudinally thereon, the vehicle will remain in position before the spectator, but will be free to rise and fall and sway to a limited degree. Hence, if the wheels of the vehicle are resting on the belt they will be rotated by the same. If the bracket 30 is of resilient material, the spectator will have the illusion not only of seeing the vehicle travelling, but travelling with its characteristic motions, depending on the nature of the outer surface of the belt 29 which is engaged by the wheels of the vehicle.

It will be understood that a multiplicity of such brackets may be employed to space a series of vehicles on the belt 29, either to control them, or even to bear most of their weight if they are to slide or glide along the top bight of belt 29 (belt 29's top bight) with a minimum of friction.

In Figs. 1, 3 and 7, the special form of bracket shown is designed for use with a miniature locomotive and tender. Therefore, the belt 29 (Fig. 3) is provided with parallel ridges 32, either cut, molded, or attached thereto longitudinally, to the required gauge of the wheels of the locomotive and tender. The transverse portion of the bracket 30 is preferably inserted between the locomotive and tender beneath the connected deck plate, and among the draw-bars and piping at such point. Since all this is in shadow, and the spectator sees only the end portion of the bracket, it is virtually impossible for him to be aware of its presence. The longitudinal portion of the bracket will parallel the rear side or frame of the tender and the portion of the bracket below will be positioned behind one of the tender's solid wheels, thus making the entire bracket virtually invisible from the spectator's viewpoint. As the transverse portion of the bracket is inserted loosely between the locomotive and tender, this enables them to sway to an extent limited only by the gauge of the track and side motion of the belt 29, and move up and down should any roughness of the rails or ridges 32 be present. Also, if the bracket 30 is resilient, a slight surging of the locomotive and tender may occur, adding to the realism. In contradistinction to this arrangement, the retaining device in my above mentioned patent was visible to the spectator through the wheels, and provided for no slight forward or backward motion on the part of the locomotive. Moreover, it was rigidly attached to the locomotive, and in certain circumstances would rock it and cause it to derail.

It will be appreciated that because of the arrangement of the wheels of the vehicle between the rails 32, no collars or the like are necessary on the transverse portion of the bracket 30 to retain the vehicle in connection with the bracket.

It will also be appreciated that for land vehicles other than miniature trains, the longitudinal portion of the bracket 30 is unnecessary. It is further evident that as many miniature cars may be coupled to the tender and ride the moving track behind it, as the top surface of the belt 29 will support.

Assuming that bracket 30 comprises only the affixing, vertical and transverse portions, and that wheeled vehicles having spoked wheels are displayed in the apparatus, the vertical portion of the bracket would then be visible either below the vehicle's frame or through the blur of the moving spokes.

In the event that a vehicle of considerable weight is carried by the belt 29, rollers 77 may be rotatably supported beneath the top of frame 8 (Figs. 1, 2 and 3) and project through the frame top at positions beneath the points of contact between the belt and the wheels of the vehicle whereby to avoid undue friction between the belt and the top of the frame.

To enhance the illusion, use is made of longitudinally placed and stepped vertical rollers 33 fixed to shafts 17, and around which are passed endless scenery strips 34 which derive their motion longitudinally before the spectator's aperture 1b by operatively connecting one or both rollers with the prime mover 28, through the instrumentality of a belt 35 (for example, in Fig. 1).

The strips 34 are, preferably, of a flexible material to maintain themselves stable, or comparatively so, when placed in an upright position, or in a vertical plane as to their width. In small apparatus, these strips may be driven directly by the vertical rollers, but in larger ones it is preferable to drive them through on intermediate means, comprising, for example, drive belts 36 (Figs. 3 and 4) operating in grooves 37 in the rollers 33. Such belts are provided with projections which may be in the form of hooks 38, with or without a vertical extension 38b to support the scenery strips. In the example illustrated, the bottom portion of the scenery strip 34 is provided with an auxiliary strip of webbing or flexible material 39, stitched or otherwise affixed to the inner surface of the lower edge portion of the scenery strip. The auxiliary strip is provided with holes 40 arranged at suitably spaced points lengthwise of the strip and designed to receive the hooks, as will be clear from Figs. 5 and 6. When the hooks are thrust through the holes the scenery strip 34 will be free to move a limited amount longitudinally along the horizontal shanks of the hooks in relation to the drive belt 36, the amount of such movement in one direction being limited by the turned end 38a of the hook, and in the opposite direction by the point of the hook's fixation to the drive belt 36. This arrangement furnishes compensation for the extra arc traversed by the scenery strip or belt when rounding the rollers 33 at each end of its course through the apparatus, and also averts considerable strain upon the scenery strips in operation. Where this compensating means is employed, it is possible to have the scenery belts a loose fit with relation to the rollers 33.

In previous devices in which the object was to convey to the spectator the sense of travelling upon a vehicle, and not of viewing a travelling vehicle, use has been made of co-axial pulleys of various diameters, or a pair of co-axial cones to operate scenery strips either hung and guided convergently toward either medial portions through a multiplicity of small pulleys and strings alleged to be invisible to the spectator, yet in plain view of him, or of considerable overall transverse width stretched between cords running around the top and bottom cones on two vertical shafts, said strips being cut to show the slower moving strips behind the faster moving foreground strip. In both instances such strips are virtually revolving curtains, depending on suspension from the top or near the top of such an arrangement.

My present conception contemplates the use of comparatively narrow strips which slide on their bottom edges on floors 42 between the end rollers 33, certain of the floors being provided with upright fence guides 43 to prevent the scenery strips from sagging inward toward the central line between the two rollers. To my knowledge, in previous devices, no precaution was taken to eliminate sag, whip, or undulation of such scenery strips, with resultant variations in the lighting thereof perceptible to the spectator, nor was any means provided for compensation between the cables or cords when rounding the end pulleys or cones. In the present conception, unit stepped rollers 33 on vertical shafts are employed, and the fitting of a brake or drag 44 (Fig. 1) to the idler roller provides a means of keeping the scenery strips taut in their course on the side seen through the spectator's aperture 1b.

A further guard against sag, whipping or undesired undulations may be provided by tilting the axes of the shaft 17 slightly off the true vertical to cause the front portions of the scenery strips 34 to lie of their own weight upon the fence guides 43.

One or both of the shafts 17 may be provided with auxiliary power take-offs, as indicated at 45 in Fig. 1, to convey power to other units in the apparatus.

The shafts 17 are journalled in brackets 46 and 47, the latter being provided with suitable means for adjustment to take up slack in the scenery belts 34 or their assembly with the drive belts 36. Obviously, further slack adjustment or individual adjustments may be obtained through the use of conventional belt tighteners (not shown) disposed at suitable points between the main scenery rollers 33.

In contradistinction to my previous invention, wherein a single vertical panorama including the sky was passed by, the present conception has the sky panel 2 fixed against movement longitudinally of the apparatus, as observation has shown that, when viewing a vehicle travelling at continuous speed, the sky does not seem to move, and if it is desired to show passing clouds, the sky panel, as heretofore mentioned, may be of translucent material with clouds projected upon it from the rear of the panel.

Moreover, this enables an aircraft 48 to be affixed to and supported by the panel 2 by means of a bracket 49 (Fig. 2). Such bracket may be rigidly attached to the sky panel if it is desired to portray aircraft in smooth flight, the illusion being created by the passage below of the scenery strips 34, but if it is desired to show aircraft yawing, undulating or tilting at times, as in actual flight conditions, then the bracket 49 may be loosely arranged in a hole provided in the panel 2, and provided with a crank or the like 50 for securing a relatively slight motion. For this purpose, a disk mounted at one of the upper ends of the shaft 17 may be provided with a crank 51, connected by a rod 52 to the crank 50 of the bracket.

Since the bracket or brackets 49 (if more than one is employed) might cast shadows that would destroy the illusion that the aircraft is actually floating free in flight, shadowless lighting is provided by so situating the sources of interior light thereof as to balance in intensity, these being exemplified in Fig. 1 by the fluorescent tubes 54 mounted within the casing on the end walls thereof.

Another means of creating the illusion that an aircraft is floating freely in flight can be provided by means of a second transparent panel 55 (Fig. 3) arranged immediately back of the front wall of the apparatus, and vertically movable in guides 56 so that it can be raised and lowered. A miniature aircraft 57 may be affixed to this panel at one lateral extremity of the aircraft, by any suitable means, preferably transparent, or if the panel 55 is situated further behind the viewing aperture 1b, the aircraft may be affixed to the panel 55 or fitted therein in such a manner as to make its fitment undetectable to the spectator provided there is no lighting glare on the surfaces of the panel. In this respect, the employment of the reflectionless glass developed during World War II is contemplated.

It will be appreciated that in the above means of conveying the illusion of the aircraft being in free floating flight, the use of the bracket or brackets 49 supported by the sky panel 2 is not vital, and it may be relegated to an auxiliary supporting function, if retained. Thus it is possible to have one aircraft affixed at its rear extremity or by bracket 49 to sky panel 2 in one level of flight above the scenery strips 34, while another aircraft 57 affixed to the panel 55 might be shown at another level through raising or lowering it in relation to sky panel 2, or the vertical deviations of two aircraft in flight can be simulated by raising and lowering both the panels 2 and 55 in any sequence or timing required to create such an illusion, as when aircraft are flying in formation and meet with vertical air currents. Simulation of the landing and take-off of aircraft may be obtained by the lowering or raising of the panels until the wheels, skids, pontoons, or the like of the panel-supported aircraft contacts or leaves the top surface of the raised frame 3 or the belt 29 thereon, in which case, if the belt were in motion, it would cause aircraft landing wheels to turn upon contact therewith.

By cutting off the driving power of the apparatus the moving belt 29 and the scenery strips 34 may coast to a stop, giving the illusion of a landed plane coasting to a full stop. If then the power were thrown on, and after an interval the sky panel 2 or the panel 55, or both, as required by the aircraft subject, were raised at a logical rate of ascent, and the top surface of belt 29 and frame 6 lowered out of sight, the aircraft would seem to gather headway along an air strip or launching device and take to the air in full flight, with no apparent means of retention before the spectator.

If it is desired to depict a race between vehicles of any or all three elements—land, water, or air—this may be accomplished by the retention of one or more of the vehicles before the spectator by the means heretofore described, but another or others may be portrayed as overtaking and passing another by provision of, for example, a pulley 59 (Fig. 1-A) at the top of one of the shafts 17, connected by a belt 60 to a pulley 61 at the lower end of a vertical shaft 62 having a pulley 63 at the upper end thereof. A belt 64 passes around pulley 63 and about pulley 65 adjacent the opposite end of the frame, and a dirigible or aircraft 66 may be supported by the belt and moved thereby past the aperture 1b. In this instance, the dirigible is not connected to the sky panel 2, but is suspended from the belt by a hanger or hangers 67, preferably of transparent material and with a reflectionless surface. As the belt 64 is positioned above the viewing aperture 1b, the dirigible apparently enters the spectator's field of view from the left, overtakes and passes the ship 10, and disappears behind the right vertical edge portion of the aperture 1b, returning to repeat this unless power is cut off to belt 64. By similar means land or marine subjects may be shown overtaking and/or passing.

Figs. 6 and 7 depict means for showing the passage of representations of telegraph or telephone poles or similar objects designed to support electric wires or transmission or conductor lines where such are a feature of the landscape. This may be done in a location adjacent to the subject vehicle, or further away in the general scenic scheme. It will be appreciated that where it is done adjacent to a vehicle retained upon the top surface of the belt 29, care must be taken so as not to foul the bracket 30, as the poles or vertical objects move past before the spectator.

In depicting the wires of such an installation, advantage is taken of the phenomenon that wires at a distance, provided they are not agitated or whipped or distinctively marked, cannot be recognized as being in longitudinal motion or as at rest. Hence the wires 70 for this portion of this illusion are maintained at rest through the use of the fixed bracket 71 shown as supported from the frame 8 by vertical poles 71a arranged out of sight of the spectator's aperture. The brackets 71 are formed to support one level of wires in Fig. 8, whereas in Fig. 10 where two or more levels of wires are used, the brackets 71x are recessed as at 71b to provide for the added levels of wires.

The wires 70 are stretched between these brackets tightly if desired to represent a recent wire installation, or with some slack, if a longer existence one is portrayed.

The arms 72 of the telegraph poles 73 (carried by belt 36) are provided with dummy insulators 74 which engage and slide along the underside of the wires 70 in view of the spectator, conveying the illusion that the wires also are moving. Where the wires are slack, this movement of the poles will carry a wave along the wires between the moving poles, typical of a long-installed wiring job. In the case of a catenary overhead conductor of an electrified railway, or certain types of overhead wiring for street-cars, or other instances, the poles, brackets or overhead gantries would slide along the tops of the wires 70, in which case tautness of the wires would be essential to realism, as well as an altered design for the brackets 71 (not shown). While the wires would be supported by inverting the heads, in the case of catenary constructions such representation of all but the actual conductor wire would have to be suspended between and carried along by the poles or gantries and be flexible in order to go around the ends of the pole or gantry circuit.

Figs. 9 and 10 show alternative means, in which an elevation of the frame 8 and the horizontal rollers 23 and 23a with the belt 29 are shown. In this case the construction of wires and brackets supporting them is similar to that in Fig. 7, but the poles 73 are affixed to the belt 29, either by forcing into grommets 73a in belt 29, as shown in Fig. 10, or other suitable means of attachment. It will be appreciated that the longitudinal movement of the belt 29 will convey the poles through the field of view of the spectator's aperture, with the cross-arms of the poles sliding under the wires 70.

In Fig. 7, a signal bridge 75, as for a railroad, is shown in top plan, attached to a vertical drive belt 36 on one side. The other side of this signal bridge is left free, but slides or rolls on the stationary guide 76. Due to this bridge being virtually inverted U as to form, and the location of the scenery rollers 33 in relation to the horizontal moving belt 29, and the position of the retention bracket 30, it will be understood that this bridge can thus be swept through the viewing aperture's field of vision clearing the belt 29, any vehicle mounted thereon, and the bracket 30, and, if desired, the wires 70 and their supporting brackets shown.

It will be appreciated that in a similar manner roadside objects (not shown), either cutouts or three-dimensional, may be attached to either a vertical drive belt 36 or the horizontal belt 29 to show them passing the subject vehicle or vehicles displayed, to add to the realism. With suitable modification thus, high tension lines and towers (not shown) may be portrayed, as well as the wiring installations mentioned heretofore, or columns, conduits, or piping, as when an elevated or subway train is the subject vehicle. In this field also such objects as stations may be envisaged, and with suitable timing, a subject vehicle or vehicles may be shown stopping at them and starting again, yet always in view of the spectator; also boats docking or leaving port, and aircraft landing and taking off from an airport.

While the device as disclosed may in most instances include miniature vehicles, it is to be understood that full sized or actual vehicles may be used with the structure of such dimensions as to accommodate same.

While I have disclosed what I now consider to be some preferred embodiments of the invention and various modifications of the details thereof, I am aware that changes may be made in the structures disclosed without departing from the spirit of the invention as expressed in the following claims.

What I claim and desire to secure by U. S. Letters Patent is:

1. A display apparatus comprising a casing having a front wall with a viewing aperture therein, means for supporting a vehicle in the casing within range of the aperture, co-axial stepped rollers mounted in the casing on substantially vertical axes adjacent the ends of the casing rod beyond the range of said aperture, and scenery strips extending around and having lower edge portions supported by said rollers and visible beyond the vehicle through said aperture.

2. A display apparatus according to claim 1, wherein said axes are slightly inclined rearwardly with respect to the aperture, and supports parallel with said axes for engagement of the strips therewith between the rollers.

3. A display apparatus including a housing having a viewing aperture therein, a set of stepped rollers mounted in the housing on a substantially vertical shaft adjacent each end of the housing and beyond range of the aperture, a plurality of scenery strips extending around corresponding stepped rollers of the two sets thereof with portions of the strips visible through the aperture, a groove in each roller, and a compensating drive belt connected with each strip for limited movement relative thereto and engageable in corresponding grooves in the rollers.

4. Apparatus according to claim 3, wherein said connection between the belt and strip comprises a flexible strip secured at opposed edges thereof to the scenery strip and provided with an aperture and a clip attached to the belt and extending through said aperture.

5. Apparatus according to claim 3, wherein said shafts are slightly inclined in a direction away from said viewing aperture, and horizontal and vertical supports disposed between the shafts for engagement of the lower edges and sides of the strips therewith.

6. A display apparatus comprising a housing having a vertical wall with a viewing aperture therein, a vertically movable frame disposed within the housing adjacent the lower edge of the aperture, horizontal rollers supported by the frame adjacent opposite ends thereof, a belt extending around said rollers and over said frame, means for imparting rotation to one or both of the rollers with corresponding horizontal movement of the belt, and means supported by the frame for retaining a miniature vehicle over said belt for limited movement in different directions.

7. Apparatus according to claim 6, provided with a rotatable cam engageable with the frame for imparting vertical and tilting movement thereto, and means for moving the frame out of contact with the cam.

8. Apparatus according to claim 6, together with a vertically movable sky panel arranged at one side of said frame, and means for supporting an aircraft from the panel within range of the viewing aperture.

9. A display apparatus comprising a housing having a wall with a viewing aperture therein, horizontal rollers in the housing, a belt extending around the rollers, means for retaining a vehicle over the belt, substantially vertically disposed stepped rollers arranged adjacent opposite ends of the housing, scenery strips mounted on the rollers and having portions visible through the aperture and arranged rearwardly of the belt, and means for imparting rotation to the strip rollers.

10. Apparatus according to claim 9, together with a sky panel in the housing rearwardly of the viewing aperture, an aircraft supported by the panel for limited movement in a vertical plane, and means for imparting movement to the aircraft.

11. Apparatus according to claim 9, together with a horizontal belt supported by the housing above the viewing aperture, means for supporting an aircraft from the belt for visibility through the aperture, and means for imparting movement to the last mentioned belt with a resulting movement of the aircraft past the viewing aperture.

12. Apparatus according to claim 9, provided with a transparent vertically movable panel closing the viewing aperture, and means for supporting an aircraft from the panel.

13. Apparatus according to claim 6, wherein said vehicle supporting means comprises a bracket including a vertical portion merging into a horizontal portion normal to the vertical portion, the bracket being so disposed on the frame that the said portions thereof are concealed by parts of the vehicle, the bracket being attached to the frame beyond the vehicle relative to the viewing aperture.

14. In an apparatus of the character described, a housing having a front wall provided with a viewing aperture, horizontal rollers in the housing spaced a greater distance than the length of the aperture, a first belt mounted on said rollers and having a top bight positioned adjacent to the lower edge of the aperture, substantially vertical rollers arranged in the housing and spaced apart a greater distance than the length of the aperture, a second scenery belt mounted on the last mentioned rollers, means for rotating certain of said rollers to cause movements of the belts, means for retaining a miniature wheeled vehicle on the top bight of the first belt, a bridge carried by the second belt and adapted to travel over the first belt, and a guide for supporting the free end of the bridge.

15. A display apparatus comprising a vertical wall having a viewing aperture therein, a horizontal support beyond said wall, flexible means invisible to a viewer carried by said support for supporting a land vehicle for limited movement in different directions beyond the wall and within range of the aperture, a surface horizontally movable on said support and being operative to impart movement to the vehicle, said horizontally movable surface comprising the upper run of an endless belt mounted on horizontally disposed rollers supported in a vertically adjustable frame, and said frame including said horizontal support.

PAUL HEWLETT EGOLF, Sr.

REFERENCES CITED

The following references are of record in the file of this patent:

UNITED STATES PATENTS

| Number | Name | Date |
|---|---|---|
| 423,171 | Knell | Mar. 11, 1890 |
| 455,288 | Knell | June 30, 1891 |
| 1,375,261 | Rasmussen | Apr. 19, 1921 |
| 1,538,178 | Deighan | May 19, 1925 |
| 1,545,133 | Egolf | July 7, 1925 |
| 1,617,724 | Santos | Feb. 15, 1927 |
| 1,711,790 | Johnson | May 7, 1929 |
| 1,756,175 | Boyd | Apr. 29, 1930 |
| 1,855,648 | Prins | Apr. 26, 1932 |
| 2,072,018 | Ashe | Feb. 23, 1937 |
| 2,102,474 | McKenna et al. | Dec. 14, 1937 |
| 2,104,105 | Schmidt | Jan. 4, 1938 |
| 2,196,423 | Musaphia | Apr. 9, 1940 |